United States Patent [19]

Dudel

[11] Patent Number: 5,424,134
[45] Date of Patent: Jun. 13, 1995

[54] WEAR-RESISTANT LAYER ON A COMPONENT AND PROCESS FOR THE PRODUCTION THEREOF

[75] Inventor: Klaus Dudel, St. Sulpice, Switzerland

[73] Assignee: Castolin S.A., St. Sulpice, Switzerland

[21] Appl. No.: 969,175

[22] PCT Filed: Apr. 18, 1992

[86] PCT No.: PCT/EP92/00867
§ 371 Date: Jan. 27, 1993
§ 102(e) Date: Jan. 27, 1993

[87] PCT Pub. No.: WO92/21785
PCT Pub. Date: Dec. 10, 1992

[30] Foreign Application Priority Data

May 30, 1991 [CH] Switzerland ............... 1594/91

[51] Int. Cl.6 ............... B23K 35/22
[52] U.S. Cl. ............... 428/457; 148/23; 148/24; 148/514; 148/559; 428/375; 428/403; 428/469; 428/500; 428/698

[58] Field of Search ............... 428/457, 698, 469, 704, 428/375, 403, 463, 500; 148/514, 559, 23, 24

[56] References Cited

U.S. PATENT DOCUMENTS 3,049,435  8/1962  Shwayder ............... 117/22
3,479,231  11/1969  Joseph ............... 148/24
4,493,738  1/1985  Collier et al. ............... 148/24

FOREIGN PATENT DOCUMENTS 1020107  11/1951  France .
2193676  2/1974  France .
3441266  7/1985  Germany .

Primary Examiner—Archene Turner
Attorney, Agent, or Firm—Bachman & LaPointe

[57] ABSTRACT

A wear-resistant layer on a component which is exposed to a high wear loading has a material mixture comprising at least one metallic material in powder form and a non-metallic oxide-dissolving fluxing agent in powder form which by the addition of a resin-like non-corroding stable binding agent is converted into a form which is applied to the component by being spread or laid thereon, and fused.

22 Claims, No Drawings

WEAR-RESISTANT LAYER ON A COMPONENT AND PROCESS FOR THE PRODUCTION THEREOF

BACKGROUND OF THE INVENTION

The invention relates to a wear-resistant layer on a component which is exposed to a high level of wear, and a process for the production of such a layer.

Many processes are used for coating parts or workpieces, such as for example thermal spraying, CVD, PVD and galvanic processes.

Processes are also known, in which the material for the coating is applied by brushing in the form of a paste or in which it is applied as a strip. It will be appreciated that in that case they can only be fused in position in a vacuum or under a reducing protective gas.

All those processes involve very high levels of cost, because of a high level of apparatus expenditure, and for that reason such coating operations can only be carried out in the workplaces which ale equipped for that purpose.

Therefore, for producing simple and inexpensive mass-produced components, it is necessary to find a process for applying corrosion-resistant and wear-resistant layers, which process makes it possible to keep the costs of a protective coating as low as possible.

SUMMARY OF THE INVENTION

That object seen by the inventor is attained by the teachings of the present invention which; by virtue of the use of a material mass in paste or strip form, which comprises metal powder, with or without one or more hard substances, a fluxing agent and a resin-like binding agent, it is possible for the applied material to be fused in position, without taking into consideration the ambient atmosphere, for example in air or with an autogenous flame or in a muffle furnace, without protective gas.

The present invention provides a wear-resistant layer on a component which is exposed to a high wear loading, which comprises a material mixture comprising at least one metallic material in powder form and a non-metallic oxide-dissolving fluxing agent in powder form which by the addition of a resin-like non-corroding stable binding agent is converted into a form which is applied to the component by being laid or spread thereon, and fused.

In addition, the present invention provides a process for the production of a low-wear protective layer on a component which is exposed to high wear loading, which comprises mixing at least one metallic material in powder form and a non-metallic oxide dissolving fluxing agent in powder form, and adding a resin-like non-corroding stable binding agent to the material mixture, whereafter said binding agent-containing material mixture is spread on or laid on the component, and fused in position.

DETAILED DESCRIPTION OF PREFERRED EMBODIMENTS

Further advantages, features and details of the invention will be found hereinbelow.

EXAMPLE 1

For the production of a self-sharpening blade cutting edge, a material mass in paste form was applied to a steel plate using a brush, the material mass comprising a mixture of an Ni-Cr-B-Si-alloy powder with 25% by weight of chromium, 0.2 to 2.0% by volume of fluxing agent and 4 to 6% by volume of a water-soluble methacrylate. After drying and hardening that layer was fused with a flame.

After the fusing operation the coating produced in that way presented a clean and smooth surface which was distinguished by good corrosion resistance.

EXAMPLE 2

To produce the material mass in paste form, 0.1 to 1.5% by volume of fluxing agent and 5 to 7% by volume of methacrylate were added to a material mass in paste form comprising a mixture which contained an Ni-Cr-B-Si-alloy material and a tungsten carbide powder with a mixing ratio of 50:50. Production of the coating on a wearing component was effected as described in Example 1. The finished layer had a high level of resistance to wear.

EXAMPLE 3

A coating was produced as in Example 1, using a material mass in paste form comprising a mixture of an Ni-B-Si-alloy powder and chromium borides in a mixing ratio of 70/30. Added to that mixture were 2.5 to 4.5% by volume of fluxing agent and 3 to 10% by volume of a water-soluble methacrylate.

The coating produced in that way afforded good resistance to corrosion and wear.

EXAMPLE 4

A coating was to be applied to a tool subjected to intensive high-temperature wear loading. This Example involved applying to the loaded surface a material mass in strip form comprising a mixture of 20% by weight of an Ni-Cr-B-Si-alloy powder and 80% by weight of chromium carbide powder which were mixed with 2.2 to 5.1% by volume of benzine-soluble methacrylate and 1 to 3% by volume of fluxing agent. The thick paste produced in that way was now rolled out to form a strip, dried and hardened. The strip was now applied to the part of the workpiece to be coated, and fused in position in a muffle furnace without protective gas.

The coating produced in that way, with a layer thickness of 2 mm, exhibited good resistance to high-temperature wear.

EXAMPLE 5

Applied to the surface of a component which is to be in part provided with a coating of a corrosion-resistant material was a material mass in strip form, which comprised a mixture of an Ni-Cr-B-Si-alloy powder with a chromium content of 16% by weight, 4 to 5% by volume of fluxing agent and 4 to 6% by volume of benzine-soluble methacrylate. An induction soldering installation was used for fusing in position the strip-form material mass applied to the component.

The layer applied met the requirements made in regard to resistance to corrosion.

EXAMPLE 6

The coating operation was carried out as described in Examples 4 and 5, with the difference that the mixture for the material mass in strip form comprised a mixture of 50% by weight of an Ni-Cr-B-Si-alloy powder, and with 50% by weight of a hard material mixture with 25% by weight of tungsten carbide and 75% by weight of chromium carbide, to which 4 to 6% by volume of fluxing agent and 3 to 5.5% by volume of benzine-soluble methacrylate were added.

The paste produced in that way was now rolled out and hardened. Use corresponded to the manner of use described in Example 4.

I claim:

1. A layer on a component which is exposed to a high wear loading, which comprises a material mixture comprising at least one metallic material in powder form and a non-metallic oxide-dissolving fluxing agent in powder form which by the addition of a non-corroding water-soluble stable binding agent is converted into a coatable paste for application to the component by being laid or spread thereon, and fused to form a hardened, wear resistant coating on said component having an exposed coating surface, the said metallic material being at least one of a Ni-B-Si base alloy, an alloy on a Ni-Cr-B-Si base, and a mixture of a Ni-B-Si alloy and a Ni-Cr-B-Si base alloy.

2. A layer according to claim 1 wherein the material mixture includes as a binding agent for the material mixture, salts of methacrylates.

3. A layer according to claim 2 wherein the material mixture includes benzene-soluble methacrylic acid esters as a binding agent for the material mixture.

4. A layer according to claim 1 including a polyurethane resin as a binding agent for the material mixture.

5. A layer according to claim 1 including an amount of binding agent in the material mixture of below 16% by volume.

6. A layer according to claim 5 wherein the amount of binding agent in the material mixture is from 2 to 8% by volume.

7. A layer according to claim 1 wherein the fluxing agent is at least one of boron-oxygen compounds and boron-fluorine-oxygen compounds.

8. A layer according to claim 1 wherein the proportion of fluxing agent in the material mixture is between 0.5 and 20% by volume.

9. A layer according to claim 8 wherein the proportion of fluxing agent in the material mixture is between 1 to 10% by volume.

10. A layer according to claim 1 including the addition of hard substances to the material mixture in powder form wherein the proportion of hard substances in the material mass is between 20 and 90% by volume.

11. A layer according to claim 10 wherein the proportion of hard substances in the material mass is below 80% by volume.

12. A layer according to claim 10 including carbides as the hard substance additives.

13. A layer according to claim 10 including at least one of the following as hard substance additives, tungsten carbides, borides, silicides, and nitrides.

14. A layer according to claim 10 including an addition of cobalt.

15. A process for the production of a protective layer on a component which is exposed to a high wear loading, which comprises mixing at least one metallic material in powder form and a non-metallic oxide-dissolving fluxing agent in powder form, and adding a resin-like non-corroding water soluble, stable binding agent to the material mixture, wherein the material mixture with the fluxing agent and the resin-like water soluble binding agent is converted into a coatable paste which after being applied to a member to be coated is hardened to form a hardened, wear resistant coating on said member having an exposed coating surface, the said metallic material being at least one of a Ni-B-Si base alloy, an alloy on a Ni-Cr-B-Si base, and a mixture of a Ni-B-Si alloy and a Ni-Cr-B-Si base alloy.

16. A process according to claim 15 including the step of applying said coatable paste to a member to form a hardened, wear resistant coating thereon.

17. A process according to claim 15 wherein the material mixture is formed into a strip at a temperature below 141° C. and hardened.

18. A process according to claim 17 wherein the material mixture is formed into a strip at a temperature between 80° and 140° C., and hardened.

19. A process according to claim 15 including mixing hard substances with the material mixture.

20. A process according to claim 19 including the step of coating the hard substances with a material selected from the group consisting of nickel and cobalt before mixing same with the material mixture.

21. A layer according to claim 2 wherein the material mixture includes water-soluble methacrylic acid esters as a binding agent for the material mixture.

22. A layer according to claim 13 including tungsten melt carbides as hard substance additives.

* * * * *